United States Patent [19]

Schukat

[11] Patent Number: 4,985,706

[45] Date of Patent: Jan. 15, 1991

[54] PROCESS FOR DATA TRANSMISSION BY MEANS OF A GEO-STATIONARY SATELLITE AND AT LEAST ONE SUB-SATELLITE

[75] Inventor: Manfred Schukat, Bruckmuehl/Goetting, Fed. Rep. of Germany

[73] Assignee: Messerschmitt-Boelkow-Blohm GmbH, Ottobrunn, Fed. Rep. of Germany

[21] Appl. No.: 250,622

[22] PCT Filed: Dec. 19, 1987

[86] PCT No.: PCT/EP87/00804

§ 371 Date: Oct. 17, 1988

§ 102(e) Date: Oct. 17, 1988

[87] PCT Pub. No.: WO88/04866

PCT Pub. Date: Jun. 30, 1988

[30] Foreign Application Priority Data

Dec. 23, 1986 [DE] Fed. Rep. of Germany ....... 3644176

[51] Int. Cl.$^5$ ........................................... H04B 7/185
[52] U.S. Cl. .................................................. 342/352
[58] Field of Search ................ 342/356, 353, 352, 355

[56] References Cited

U.S. PATENT DOCUMENTS 4,839,656  6/1989  O'Neill et al. .

Primary Examiner—Theodore M. Blum
Attorney, Agent, or Firm—W. G. Fasse; D. H. Kane, Jr.

[57] ABSTRACT

A process for data transmission uses a geo-stationary satellite and at least one sub-satellite, the sub-satellites being placed on lower orbits. For the transmission of news, at least two data streams are transmitted with different powers. The first data stream, with a higher power is used for linking with the geo-stationary satellite ($S_1$) and the other data streams are transmitted by means of PN (pseudo-noise) sequences for linking with the sub-satellites ($S_2$). Two data transmissions thus take place in the same carrier frequency, but involving different satellites that are both within the visibility range of an earth station. This type of transmission using additional data streams of information is suitable for controlling and/or regulating the exchange of news between satellite-satellite and/or earth-satellite-earth or for controlling or regulating the orbit of the satellites.

2 Claims, 1 Drawing Sheet

PROCESS FOR DATA TRANSMISSION BY MEANS OF A GEO-STATIONARY SATELLITE AND AT LEAST ONE SUB-SATELLITE

FIELD OF THE INVENTION

The present relates to a process or method for data transmission by means of a geo-stationary satellite and at least one sub-satellite, whereby the sub-satellites are located on lower orbit paths.

DESCRIPTION OF THE PRIOR ART

News satellites generally travel along a geo-stationary circular orbit bath at an altitude of approximately 36000 km above the equator. There, the satellites have a strictly allotted orbital position so that the same transmission frequency may be used for each satellite because of the distance between two neighboring satellites. Because the geo-stationary orbit is slowly becoming filled, other satellite orbit paths are being planned, for example, sub-satellite orbit paths with an altitude of a few hundred km or so-called quasi-stationary orbit paths. Details in this context are given in the literature, for example, in:

"P. Dondl: "LOOPUS erschliesst dem Satellitenfunk eine neue Dimension"; NTZ-Archiv Vol. 5 (1983), Booklet 12, pages 327–335".

The gravest disadvantage therein is that different frequency ranges must be used to preclude mutual interferences. Namely, it is not simply possible with conventional transmission methods to use the same frequency for the geo-stationary satellite and for the sub-satellite, because this would disturb the geo-stationary satellite, particularly because during their visibility, satellites having lower orbital paths pass by several geo-stationary satellites (with respect to the radiating direction of the transmitting earth radio station) which in this case use the same frequency band. However, frequency ranges or transmission band widths are strictly internationally regulated and distributed so that they may not simply be used as desired. Thus, in order to provide for future communication requirements, additional possibilities must be provided.

OBJECT OF THE INVENTION

It is the object of the invention to provide a method of the initially described type which makes it possible to make do with the current (or prescribed) frequency ranges.

SUMMARY OF THE INVENTION

According to the invention, this is achieved in that for communication transmissions at least two data streams of the same carrier frequency, but with different powers are used, whereby the first data stream with a higher powers is used for linking with the geo-stationary satellite and the further data streams are transmitted by means of PN (pseudo-noise) sequences and serve for linking with the sub-satellite or sub-satellites.

Thus, two data transmissions take place with the same carrier frequency whereby, however, different satellites are served.

BRIEF DESCRIPTION OF THE DRAWINGS

Details of the invention are given in the dependent claims and the description, in which an example embodiment is explained in detail in conjunction with the drawings, wherein:

DETAILED DESCRIPTION OF PREFERRED EXAMPLE EMBODIMENTS AND OF THE BEST MODE OF THE INVENTION

Figure 1:
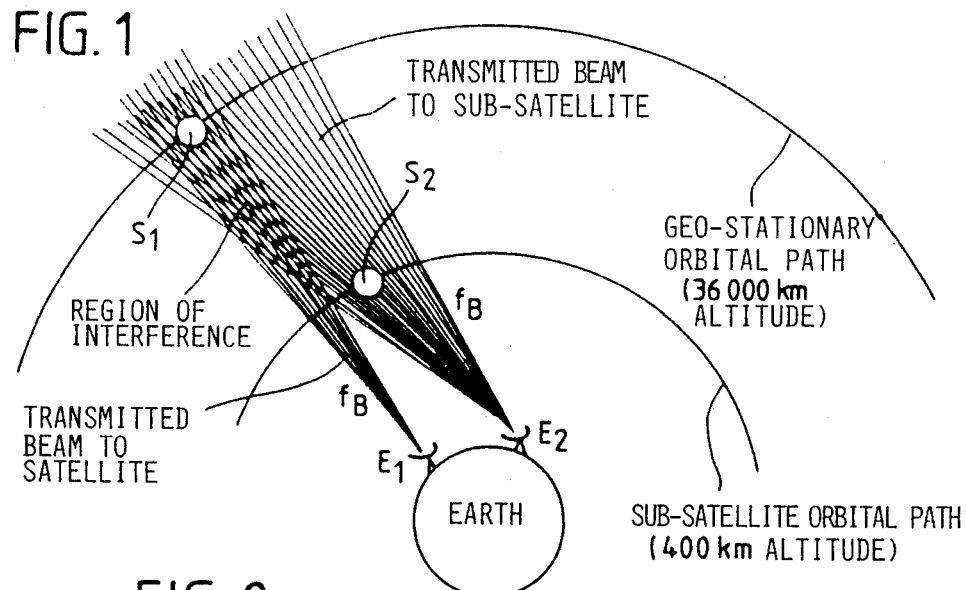
FIG. 1 shows schematically the arrangement of the satellite orbital paths and the area of interference during transmission at the same carrier frequency $f_B$.

FIG. 1 schematically shows the arrangement of the satellite orbit paths. The news satellite $S_1$ is located on a geo-stationary orbit path at a distance of approximately 36000 km altitude, and the sub-satellite $S_2$ is located on a sub-satellite orbit path at a distance of approximately 400 km altitude. Satellite $S_2$ receives data from an earth station $E_1$. Satellite $S_2$ receives data from a further earth station $E_2$. As can be seen in FIG. 1, an interference region is formed in which the two cones of the transmitting antennas overlap. For this reason, as initially mentioned, it is not simply possible to use the same carrier frequency for both earth stations.

According to the invention this is, however, made possible in that two data streams of the same carrier frequency, but of different powers are used, whereby the first data stream with a higher powers is used for linking with a the geo-stationary satellite ($S_1$) and the further data streams are transmitted by means of PN (pseudo-noise) sequences and are used for linking with the sub-satellite ($S_2$). By means of the power dependent decoupling of the two satellite systems the same carrier frequency range may be used without causing any interferences worth mentioning.

Figure 2:
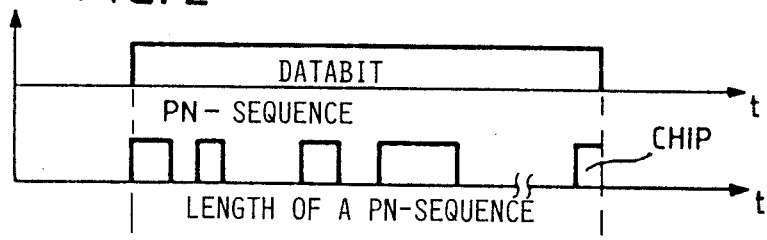
FIG. 2 shows schematically the principle of spreading by means of PN sequences.

The structure of the PN sequences is composed according to FIG. 2 in such a manner that they possess good correlation characteristics, which makes possible an exact detection of the signal. Thus, each data bit is expanded or spread to the length of one PN sequence. If the PN sequence has a length of, for example 1000 chips, then one data bit is represented by these 1000 chips. Thus, the power to be applied in this manner only amounts to 1/1000 of the power which is required in conventional methods, whereby the two data streams are decoupled from each other by a factor of 1000 with respect to their powers.

If the same band widths are used, then the transmittable usable bit rate is reduced by the spreading factor relative to the conventional data stream due to the spreading of the transmission spectrum, that is to say, due to the use of PN sequences.

In the following, it is assumed that a news link between ground stations and a geo-stationary satellite $S_1$ (e.g. ECS) exists in the 14 GHz carrier frequency range.

Now additionally, a news link at the same transmitting carrier frequency of 14 GHz is to be established via a satellite $S_2$ which is located on a different orbital path, for example, on a circular orbital path of lower altitude or on an elliptical orbital path.

Because of the lower altitude of the sub-satellite $S_2$, its range of visibility from a ground station $E_2$ is limited, that is to say, the sub-satellite S₂ is visible from the ground station E₂ for "n" minutes per revolution. The ground station E₂ must, with its antenna, fix on the sub-satellite S₂ at the rising horizon and must follow it up to the setting horizon. Thereby, under the circumstances, the antenna scans over a certain region of the geo-stationary orbital path in which the other satellite S₁ is located and thereby interferes with its news transmissions.

Figure 3A:
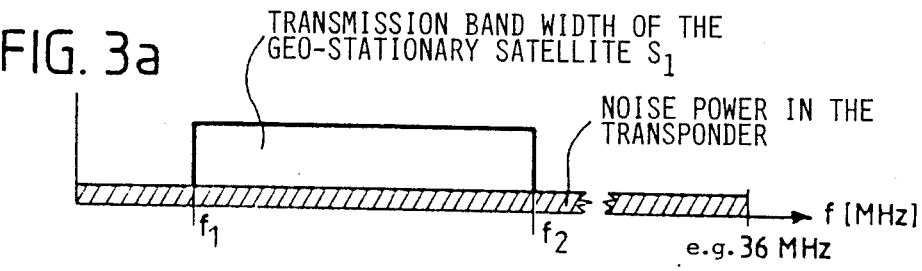
FIG. 3a shows the conditions in the transponder of the geo-stationary satellite without reception of the interfering power.

Let the ground station E₁ now transmit according to FIG. 3a, with a band width of 10 MHz to the geo-stationary satellite S₁ and let the ground station E₂ transmit with the same band width to the sub-satellite S₂. However, for transmitting, it uses a PN sequence with a spread factor of 1000.

Because the spread factor is defined as the ratio of the length of the PN sequence to the duration of a data bit, the ground station E₂ can only transmit a usable bit rate of approximately 10 KBits relative to the 10 MBits of the ground station E₁. The necessary transmission power for the 10 KBits is, however, distributed over 10 MHz, whereby the signal power is reduced so that within the 10 MHz band width of the geo-stationary satellite S₁, its own signal is only interfered with by the factor 1/1000. Thus, according to FIG. 3b only the base noise of the transponder is increased.

Thus, two data transmissions take place in the same frequency range, whereby, however, different satellites are served, which satellites are both located in the range of visibility of the earth station E₂.

Figure 3B:
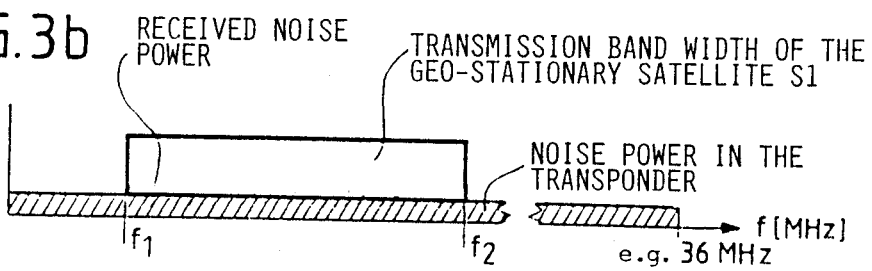
FIG. 3b shows the conditions in the transponder of the geo-stationary satellite with reception of the interfering or noise power.

The power relationships shown in FIG. 3 would only be valid if both satellites would have the same altitude. However, because the sub-satellite S₂ uses a lower altitude, a correspondingly lower power must be radiated. That further reduces the interference power received by the geo-stationary satellite as shown in FIG. 3b, particularly because this interference power is generally damped by a factor of approximately $10^{+20}$ due to the radiation reduction.

Especially advantageous applications of the invention are seen in that information for controlling and/or regulating the communications flow between satellite-satellite and/or earth-satellite-earth or for controlling and or regulating the satellites with respect to their orbital path, is transmitted by means of the additional data streams.

Although the invention has been described with reference to specific example embodiments, it will be appreciated, that it is intended to cover all modifications and equivalents within the scope of the appended claims.

I claim:

1. A method for transmitting data by means of a geo-stationary first satellite (S₁) on a geo-stationary orbit and at least one second satellite (S₂) on a different orbit at a smaller altitude than that of said geo-stationary orbit, comprising the following steps:
    (a) transmitting, for communication purposes between transmitter ground station means on earth and said first and second satellites, at least two signal data streams having the same carrier frequency and different powers,
    (b) using a first signal data stream having a higher power for communication between said transmitter ground station means and said geo-stationary satellite (S₁), and
    (c) transmitting further signal data streams having a lower power by means of PN sequences which spread said further signal data streams within a length of said PN sequences for achieving said lower power to provide a power decoupling of communications between said transmitter ground station means and said geo-stationary first satellite when communicating between said transmitter ground station means and said second satellite or second satellites, whereby said power decoupling is effective even if said first and second satellites are in such positions relative to each other and to said transmitter ground station means that an interference region is formed by antenna cones of said ground station means.

2. The method of claim 1, wherein said further signal data streams having the lower power are used for transmitting control signals to said first and second satellites for keeping said first and second satellites on their respective different orbits.

* * * * *